United States Patent
Montemurro et al.

(10) Patent No.: US 11,924,639 B2
(45) Date of Patent: Mar. 5, 2024

(54) REVOKING CREDENTIALS AFTER SERVICE ACCESS

(71) Applicant: MALIKIE INNOVATIONS LIMITED, Dublin (IE)

(72) Inventors: Michael Peter Montemurro, Toronto (CA); Stephen McCann, Southampton (GB); James Randolph Winter Lepp, Ottawa (CA)

(73) Assignee: Malikie Innovations Limited, Dublin (IE)

(*) Notice: Subject to any disclaimer, the term of this patent is extended or adjusted under 35 U.S.C. 154(b) by 264 days.

(21) Appl. No.: 16/004,798

(22) Filed: Jun. 11, 2018

(65) Prior Publication Data
US 2019/0380034 A1 Dec. 12, 2019

(51) Int. Cl.
| | | |
|---|---|---|
| H04L 9/40 | (2022.01) | |
| H04W 4/40 | (2018.01) | |
| H04W 4/50 | (2018.01) | |
| H04W 12/08 | (2021.01) | |

(52) U.S. Cl.
CPC ............ *H04W 12/08* (2013.01); *H04L 63/10* (2013.01); *H04W 4/40* (2018.02); *H04W 4/50* (2018.02)

(58) Field of Classification Search
CPC ............................... H04W 12/08; H04L 63/10
See application file for complete search history.

(56) References Cited

U.S. PATENT DOCUMENTS

| | | | | |
|---|---|---|---|---|
| 6,490,443 B1* | 12/2002 | Freeny, Jr. | ............. | G07B 15/00 455/426.2 |
| 7,366,677 B1* | 4/2008 | Liu | ......... | G06Q 10/02 709/204 |
| 8,341,717 B1 | 12/2012 | Delker | | |
| 8,619,735 B2 | 12/2013 | Montemurro et al. | | |
| 2004/0210757 A1* | 10/2004 | Kogan | .................... | B60R 25/00 713/182 |
| 2005/0125669 A1* | 6/2005 | Stewart | ............... | H04L 63/0492 713/171 |
| 2007/0101146 A1* | 5/2007 | Louch | ..................... | H04L 63/10 713/176 |
| 2008/0027602 A1* | 1/2008 | Yeap | ....................... | B60R 25/04 701/31.4 |
| 2008/0060066 A1 | 3/2008 | Wynn | | |
| 2012/0221695 A1* | 8/2012 | Rose | ........................ | G07C 9/27 709/223 |

(Continued)

OTHER PUBLICATIONS

Wi-Fi Alliance, Wi-Fi Certified Passpoint, Hotspot 2.0 (Release 2) Technical Specification, Version 1.0.0, "A Solution for Next Generation Wi-Fi Hotspots"; 2014; 207 pages.

(Continued)

*Primary Examiner* — William S Powers
(74) *Attorney, Agent, or Firm* — Botos Churchill IP Law LLP

(57) ABSTRACT

In some examples, an electronic device receives configuration information relating to network connectivity with a network of a vehicle, the configuration information including a credential. The electronic device establishes, using the configuration information, a connection with the network of the vehicle to access a service, and revokes the credential in response to a termination of the access of the service.

23 Claims, 4 Drawing Sheets

(56) References Cited

U.S. PATENT DOCUMENTS

| | | | | |
|---|---|---|---|---|
| 2012/0252420 | A1* | 10/2012 | Czaja | H04W 48/04 |
| | | | | 455/414.1 |
| 2014/0068719 | A1 | 3/2014 | Kiukkonen et al. | |
| 2014/0278608 | A1* | 9/2014 | Johnson | G06Q 10/02 |
| | | | | 705/5 |
| 2014/0331294 | A1* | 11/2014 | Ramallo | G06F 21/6245 |
| | | | | 726/16 |
| 2015/0084736 | A1 | 3/2015 | Horton | |
| 2015/0146706 | A1 | 5/2015 | Goluboff | |
| 2015/0180978 | A1 | 6/2015 | Canpolat | |
| 2015/0264051 | A1 | 9/2015 | Hoggan | |
| 2016/0295005 | A1 | 10/2016 | Schussmann | |
| 2016/0360407 | A1 | 12/2016 | Benoit | |
| 2017/0257819 | A1 | 9/2017 | McCann | |
| 2017/0295448 | A1* | 10/2017 | McCann | H04L 63/06 |
| 2018/0004933 | A1 | 1/2018 | Nathanson | |

OTHER PUBLICATIONS

IEEE, Standard for Information Technology—Telecommunications and Information Exchange Between Systems Local and Metropolitan area networks—Specific Requirements; Part 11: "Wireless LAN Medium Access control (MAC) and Physical Layer (PHY) Specifications"; 2012; 2,793 pages.
Wikipedia; "Captive Portal"; https://web.archive.org/web/20150202195543/https://en.wikipedia.org/wiki/Captive_portal; Feb. 2, 2015; 6 pages.
3GPP TS 24.234 V12.2.0 Technical Specification 3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 12) Mar. 2015 (40 pages).
WiFi Alliance (http://www.wi-fi.org/who-we-are/current-work-areas) Who We Are—Current Work Areas—Early Devlopment, Applications Service Platform 2.0 downloaded Mar. 2, 2016 (7 pages).
Wiki—(https://wiki.iotivity.org/multi-phy_easy_setup) LOTIVITY—Multi-Phy Easy Setup last modified Jan. 21, 2016 (7 pages).
WiFi Alliance (http://www.wi-fi.org/certification/programs) Certification—Programs downloaded Mar. 2, 2016 (4 pages).
WiFi Alliance (http://www.wi-fi.org/news-events/newsroom/wi-fi-alliance-announces-certification-plans-for-ieee-80211g-wireless-lan) Wi-Fi Alliance Announces Certification Plans for IEEE 802.11g Wireless LAN Products, Feb. 25, 2003 (3 pages).
Akin, Devin, 802.11i Authentication and Key Management (AKM) White Paper, May 2005 (10 pages).
Wifi Alliance, Discover Wi-Fi—Wi-Fi Protected Setup downloaded Apr. 6, 2016 (4 pages).
WiFi Alliance, Draft, Wi-Fi Device Provisioning Protocol (DPP) Technical Specification, Version 0.0.11, Mar. 22, 2016 (59 pages).
WiFi Alliance, Draft, Wi-Fi Neighbor Awareness Networking (NAN) Technical Specification, Version 1.0 r07, Jan. 18, 2016 (156 pages).
WiFi Alliance, Wi-Fi Simple Configuration Protocol and Usability Best Practices for the Wi-Fi Protected Setup™ Program, Version 2.0.1, Apr. 2011 (30 pages).
WiFi Alliance, Draft, Wi-Fi Device Provisioning Protocol (DPP) Technical Specification, Version 0.0.43, Feb. 16, 2017 (194 pages).
WiFi Alliance (http://www.wi-fi.org/who-we-are/current-work-areas—Current Work Areas, Early Development, 802.11ax dated on or before Mar. 21, 2017 (5 pages).
Dan Walkes, Trellis-Logic LLC, WiFi Configuration for LoT Devices, Apr. 16, 2015 (5 pages).
WiFi Alliance, Draft, Wi-Fi Device Provisioning Protocol (DPP) Technical Specification, Version 0.0.23, Jul. 20, 2016 (13 pages).
Lepp et al., U.S. Appl. No. 15/499,526 entitled Network Policy Configuration filed Apr. 27, 2017 (25 pages).
ISA/CA, International Search Report for PCT/CA2019/050739 dated Aug. 22, 2019 (8 pages).
Wifi Alliance, Device Provisioning Protocol Specifcation, Version 1.0, Apr. 9, 2018 (124 pages).
IPEA/CA, PCT Written Opinion of the International Preliminary Examining Authority for International Appl. No. PCT/CA2019/050739 dated May 1, 2020 (5 pages).
European Patent Office, Extended European Search Report for Appl. No. 19819710.5 dated Jan. 19, 2022 (10 pages).
Office Action issued in Chinese Application No. 201980029867.0 dated Jun. 22, 2023.
Office Action for Canadian Patent Application No. 3094831, dated Oct. 20, 2023, 4 Pages.

* cited by examiner

REVOKING CREDENTIALS AFTER SERVICE ACCESS

BACKGROUND

Vehicles have become increasingly technologically sophisticated. In some cases, users in the proximity of the vehicles are able to access the services of the vehicles. Using user devices, the users are able to establish wireless links with the vehicles to access the services of the vehicles.

BRIEF DESCRIPTION OF THE DRAWINGS

Some implementations of the present disclosure are described with respect to the following figures.

Figure 1:
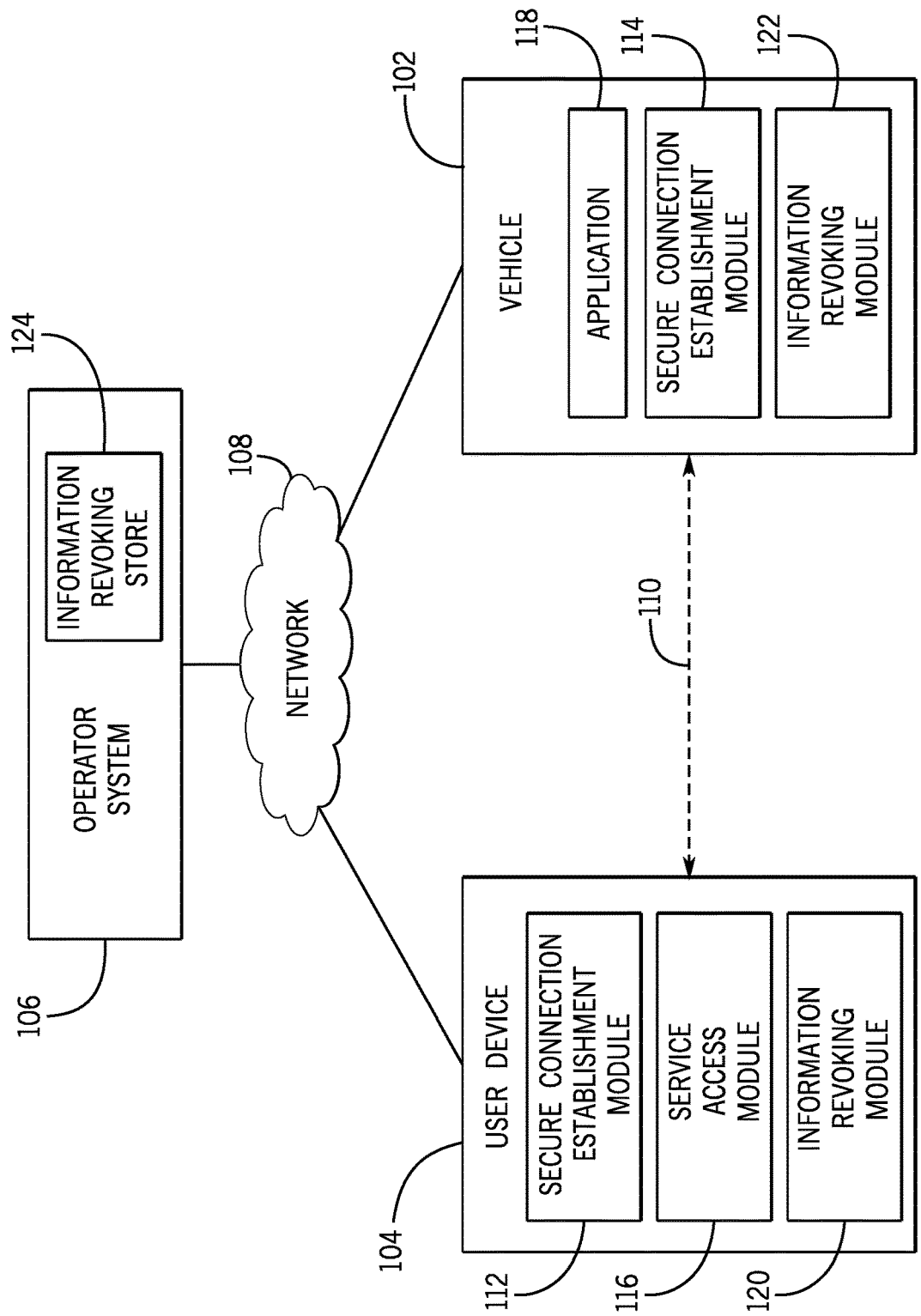
FIG. 1 is a block diagram of an example arrangement that includes a vehicle, a user device, and an operator system according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A "vehicle" can refer to any or some combination of a truck, a trailer, a tractor, a car, a railed vehicle (e.g., a train), a watercraft (e.g., a ship), an aircraft, a spacecraft, or any other moveable structure that can carry cargo or people.

A vehicle can include one or more services that are accessible by users in a proximity of the vehicle. For example, the service(s) of the vehicle can be accessible by the occupants (driver and/or passenger) of the vehicle. Alternatively, the service(s) of the vehicle can be accessible to a user that is outside but near the vehicle. Such a user can be a technician that is servicing the vehicle, a valet parker, or any other user that is near the vehicle (i.e., within a communication range of the vehicle).

Examples of services that can be provided by vehicles include wireless network connectivity (to allow for connection to a cellular network or a wireless local area network or WLAN, for example) so that a user is able to establish a communication session, playback of media content (e.g., music, video, etc.), a telephony service to allow a user to make a telephone call, access to an online music station, and so forth. Services can be accessed both internally and externally of the vehicle.

To gain access to a service of a vehicle, a security credential and profile information can be used. A security credential (or more generally a "credential") can refer to information that allows or disallows for a secured access of a service. Examples of security credentials include encryption keys, passwords, certificates and so forth. Profile information can refer to information relating to an identification of the service or an access point (AP) of a wireless network, information describing a service, wireless pairing information (e.g., Bluetooth pairing information, Near Field Communication (NFC) pairing information, etc.) for remote access to the vehicle or access to applications (e.g., Waze, Spotify, etc.), and so forth. In a wireless local area network (WLAN) that operates according to the Institute of Electrical and Electronics Engineers (IEEE) 802.11 standards, an identifier of an AP can include a service set identifier (SSID).

In some contexts, the access of a service of a vehicle can be temporary. For example, the vehicle may be a rental vehicle, a taxi, a shared vehicle, and so forth. A user can access a service so long as the user occupies or has possession of the vehicle. However, at the same or a later time, a second user can access a service of the vehicle. Thus, in some cases, even though access of a service of a vehicle is temporary, a security credential and other information associated with the access of the service by the first user may persist even after the service access is complete (or terminated). As a result, one user may be able to access personal information of another user who has accessed or is accessing a service of the vehicle.

In accordance with some implementations of the present disclosure, information used by a user to access a service of a vehicle is revoked after completion (or equivalently, termination) of access of the service by the user. Revoking the information can refer to either deleting the information or otherwise rendering the information invalid. An example of information that can be revoked includes a credential used by the user to access the service. In other examples, other information can also be revoked. For example, service access information that relates to at least one service accessible by the user can be revoked after completion of the service access. The service access information is used to access an application (on the vehicle) that provides the service.

FIG. 1 is a block diagram of an example arrangement that includes a vehicle 102, a user device 104, and an operator system 106 that is associated with an operator of the vehicle 102. An "operator" can refer to an entity that manages the vehicle 102, such as for vehicle sharing, vehicle rental, taxi ride service, and so forth. The operator can be an enterprise, such as a business organization (e.g., a rental company, a taxi company, a vehicle sharing management company, etc.). In other examples, the operator can be an individual that owns or otherwise manages the vehicle 102.

The operator system 106 can be implemented as a computer or an arrangement of multiple computers. The operator system 106 can be a server system such as a web server system, a cloud server system, and so forth. In further examples, the operator system 106 can be implemented as a mobile computing device (or an arrangement of multiple mobile computing devices).

A "user device" can refer to any electronic device that can be used by a user. Examples of user devices include any or some combination of the following: a desktop computer, a notebook computer, a tablet computer, a smartphone, a wearable device (e.g., a smart watch, smart eyeglasses, a head-mounted device), a game appliance, a computer of a vehicle, and so forth.

The vehicle 102, the user device 104, and the operator system 106 are able to communicate over a network 108. For example, the network 108 can include a public network such as the Internet. Alternatively, the network 108 can include a private network such as a local area network (LAN), a wide area network (WAN), and so forth.

The user device 104 and the vehicle 102 can establish communications using a wireless link 110. In some examples, the wireless link 110 can include a short-range wireless link, such as a Bluetooth wireless link, an NFC link, or other types of short-range wireless links. Alternatively, the wireless link 110 can include a WI-FI wireless link according to the IEEE 802.11 and Wi-Fi Alliance standards, in which case the vehicle 102 includes a WLAN AP to communicate over the WI-FI wireless link with the user device 104.

The user device 104 includes a secure connection establishment module 112 that is able to obtain information that can be used to establish a secure connection over the wireless link 110 with a secure connection establishment module 114 of the vehicle 102.

As used here, the term "module" can refer to a hardware processing circuit, such as any or some combination of the following: a microprocessor, a core of a multi-core microprocessor, a microcontroller, a programmable integrated circuit device, a programmable gate array, or another hardware processing circuit. In other examples, a "module" can refer to a combination of a hardware processing circuit and machine-readable instructions executable on the hardware processing circuit.

The information that can be obtained to establish the secure connection between the user device 104 and the vehicle 102 includes bootstrapping information and configuration information.

Bootstrapping information can be obtained by the user device 104 to perform authentication of the user device 104 with respect to the vehicle 102. Once authentication is performed, configuration can be performed to allow the user device 104 to obtain configuration information (including a credential and other information) that is used by the user device 104 to establish the secure connection over the wireless link 110 with the vehicle 102.

Once the secure connection is established between the user device 104 and the vehicle 102, a service access module 116 of the user device 104 is able to access an application 118 in the vehicle 102. The application 118 includes a program executable in the vehicle 102 to provide a service that is to be accessed by the service access module 116. The service access module 116 can be in the form of an application, a web browser, and so forth, that is executable in the user device 104.

The user device 104 additionally includes an information revoking module 120 that is able to revoke information used by the user device 104 to access the service of the vehicle 102 once the service access is complete. Service access is complete if the user device 104 performs an action (or fails to perform an action) that indicates that access of the service is no longer being performed or is terminated. For example, a user of the user device 104 may close the service access module 116 that is used to access the vehicle service. As another example, the user at the user device 104 may log out from an account that is used to access the vehicle service. As yet another example, the user at the user device 104 may activate a control item (such as in a user interface) indicating termination of access of the service. In further examples, the user may be idle for some specified time duration, which indicates that access of the vehicle service should time out.

The vehicle 102 similarly includes an information revoking module 122 that revokes information used by the user device 104 to access the vehicle service, in response to completion of the service access.

In accordance with some examples of the present disclosure, authentication and configuration (collectively referred to as "provisioning") of the user device 104 to allow for access of a service of the vehicle 102 can be according to the Wi-Fi Alliance Device Provisioning Protocol (DPP). DPP provides a provisioning scheme in which a dedicated network infrastructure for use in provisioning of wireless devices does not have to be implemented. By using DPP, use of certain servers, such as an Authentication, Authorization, and Accounting (AAA) server, a policy database, a web server, and/or other network infrastructure entities can be avoided.

DPP uses a configurator device to provision other devices (enrollee devices) within a network, where the enrollee devices can include stations (STAs) such as mobile devices or other user devices, access points (APs), peer-to-peer (P2P) client devices, P2P Group Owners (GO)s, P2P services client devices, Neighbor Awareness Networking (NAN) devices, or other types of devices. Any of a station, AP, or other device can also operate as a configurator device (referred to as a "DPP Configurator"). Devices that have yet to be configured by the DPP Configurator are called enrollee devices, and devices that have been configured by the DPP Configurator are called peers.

Generally, a "configurator device" can refer to any wireless device (e.g., a mobile device or an AP) in which an application or service is executed that is able to perform provisioning functionality. DPP operates between a pair of devices, where a first device takes on the role of configurator and the second device takes on the role of enrollee. The configurator device first authenticates the enrollee device, and then may provision the enrollee device. Provisioning includes the setup of new devices and the capability to provide a third party introduction for connectivity to other devices managed by the configurator device.

Both the configurator device and enrollee device generate public/private key pairs that are used to authenticate and establish a secure configuration channel. The secure configuration channel is then used to pass configuration information between the devices.

The enrollee device sends a set of attributions (e.g., requirements and associated parameters), and in response, the configurator device sends configuration information to the enrollee device. The configuration information can include credentials to obtain network access, and/or a configurator signing key. The configuration information can also include a list of configurator identities, a list of enrollees (in the case of a configurator), and so forth.

Although reference is made to provisioning techniques according to DPP, it is noted that in further examples, additional or alternative provisioning techniques can also be employed.

In the examples where DPP is used, a DPP Configurator can be included as part of either the operator system 106, the vehicle 102, or the user device 104. For example, if a rental car company wants to provision a new car, then they may use a master DPP Configurator in a user device to initially set it up at the garage. The provisioning performed according to DPP with the DPP Configurator allows for a credential (or multiple credentials) to be created to allow a connection of the user device 104 to the vehicle 102.

Figure 2:
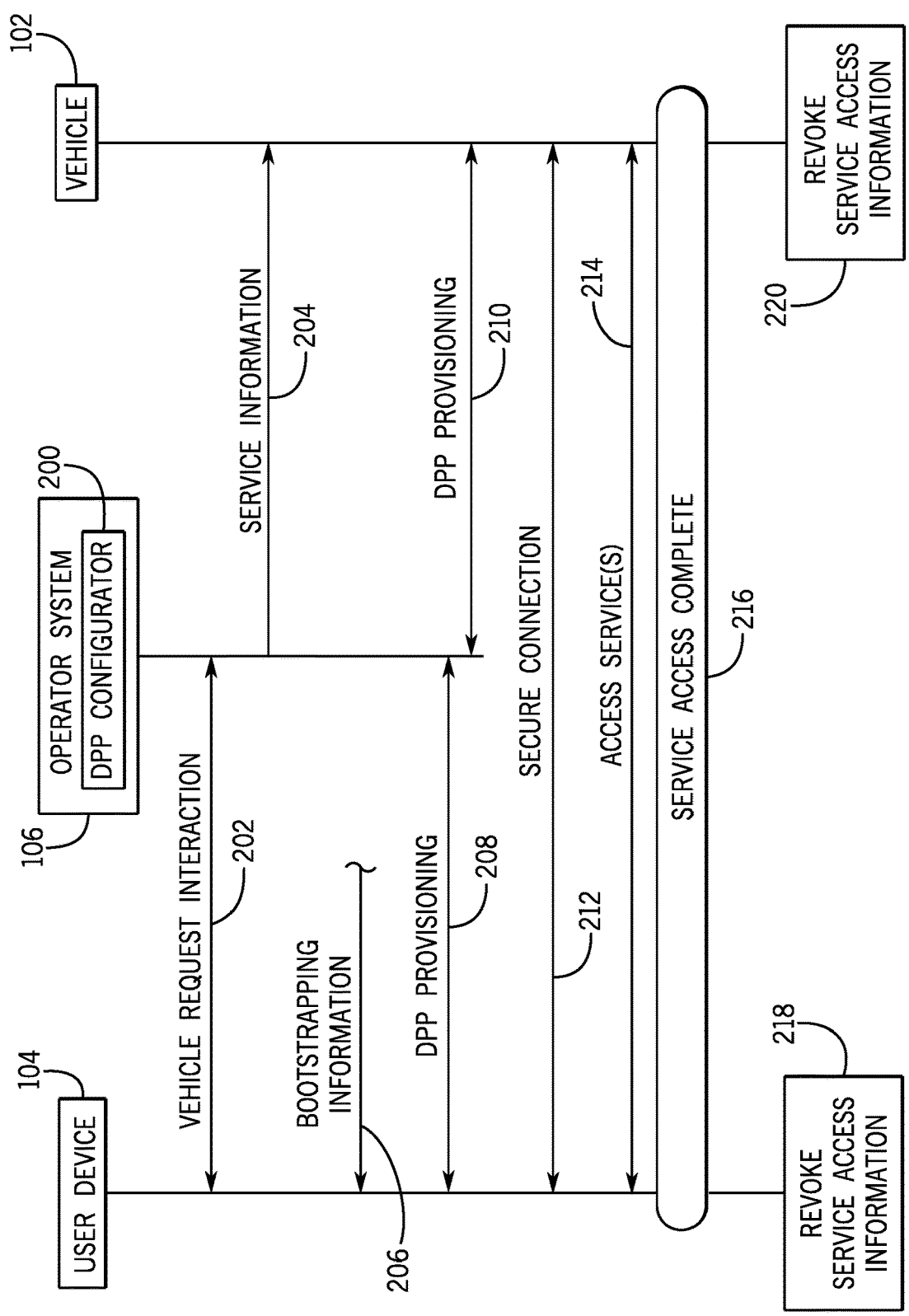
FIGS. 2 and 3 are message flow diagrams according to various examples.

FIG. 2 is a message flow diagram in which a DPP Configurator 200 is part of the operator system 106. As shown in FIG. 2, the user device 104 performs a vehicle request interaction (at 202) with the operator system 106 to allow a user of the user device 104 to obtain access of the vehicle 102. For example, in a rental vehicle context, the interaction (202) can include an online reservation in which the user uses the user device 104 to access a website of the operator system 106 to make a reservation for the vehicle 102. In a vehicle ridesharing context, the interaction (202) can be based on a user requesting a vehicle using an application of the user device 104 to hail a ride.

As part of the interaction (202), the user device 104 can be provided with location information of the vehicle 102, such as a street address or other indication of the vehicle's location.

Once the user is granted access to the vehicle 102 in response to the interaction (202), the operator system 106 can provide (at 204) service information to the vehicle at 102, where the service information indicates the service(s) that (is) are available to the user device 104. The service information can include any or some combination of the following: Bluetooth pairing information that enables the user device 104 to establish a Bluetooth connection with the vehicle 102; information of the vehicle's navigation service; information of a feature of the vehicle 102 to access local information; information of the vehicle's multimedia service; information of a toll road access service; information of priority access to special traffic lanes (such as car pool lanes); information relating to electrical charging of the vehicle 102; information enabling multi-device access; and so forth.

The service information 204 can also include the bootstrapping information for the user device 104.

The user device 104 receives (at 206) bootstrapping information. As explained below, the bootstrapping information can be obtained from any of various different sources. The bootstrapping information can be provided by the operator system 106. Alternatively, the bootstrapping information can be acquired by the user device 104 by scanning, using a camera of the user device 104, a specified code that includes the bootstrapping information. As yet another example, the bootstrapping information can be provided in a Bluetooth Low Energy (BLE) beacon transmitted using Bluetooth signals in the vehicle 102, or provided in NFC signals. As a further example, the bootstrapping information can be received over a cable (such as a Universal Serial Bus or USB cable). In other examples, the bootstrapping information can be obtained from another source.

In specific examples, a multimedia service (such as streaming audio), or third party road tolling, may be authenticated via open authentication (OAUTH) or other methods to grant access via cloud services or third party servers. In such examples, the action of obtaining access to the vehicle 102 can result in simultaneous provisioning of bootstrapping information for WLAN connectivity, out of band Bluetooth pairing, and OAUTH token provisioning to third party servers.

Once the user enters the vehicle 102 or comes within a specified proximity of the vehicle 102, using the bootstrapping information, the user device 104 can perform DPP configuration (at 208) with the DPP Configurator 200 of the operator system 106. The vehicle 102 can also perform DPP provisioning (at 210) with the DPP Configurator 200 of the operator system 106.

Within a specified proximity can be one of two things. It can be bounded by the distance the radio can operate and thus be the radius of the particular wireless technology. Or it can be a specifically measured distance using technology such as received signal strength (RSSI) or round trip time (RTT). Examples of proximity protocols include Bluetooth PXP profile, IEEE 802.11 Fine Timing Measurement, Wi-Fi Alliance Location and Wi-Fi Aware Ranging.

The DPP provisioning of the user device 104 includes authenticating the user device 104 and providing configuration information to the user device 104.

In some examples, the configuration information can include a DPP configuration object provided to the user device 104 by the DPP Configurator 200. For example, the configuration information can include WI-FI credentials, Bluetooth pairing information, an expiration time of a DPP Connector, and so forth. The configuration information can also include the DPP Connector, which includes information identifying service(s) of the vehicle 102 accessible by the user device 104. The DPP Connector can also include a credential useable to establish a secure connection for accessing the service(s) of the vehicle 102.

The DPP provisioning of the vehicle 102 includes authenticating the vehicle 102 and providing configuration information to the vehicle 102.

In examples according to FIG. 2, the operator system 106 acts as a proxy for interaction between the user device 104 and the vehicle 102. Trust in the operator system 106 allows the user to establish a secure connection with the vehicle 102.

As a result of the DPP provisioning (208 and 210), the user device 104 can establish a secure connection (at 212) with the vehicle 102. Following establishment of the secure connection (at 212), the user device 104 is able to access (at 214) a service (or services) of the vehicle 102.

Once the service access is complete (216), the information revoking module 120 of the user device 104 can revoke (at 218) service access information (e.g., including the configuration information) used by the user device 104 to access the service of the vehicle 102. Similarly, the information revoking module 122 of the vehicle 102 can revoke (at 220) the service access information used by the user device 104 to access the service of the vehicle 102. In some examples, the information revoking modules 120 and 122 can interact over a secure connection to revoke the service access information. In other examples, an information revoking store 124 or coordination unit may exist within the operator system 106, for tracking and auditing purposes. The information revoking store 124 communicates with the information revoking modules 120 and 122 through the network 108.

In examples where the configuration information (including the DPP Connector, for example) has an expiry time, the user device 104 can be provided with an alert regarding when the service access is about to expire, so that the user should return the vehicle 102 or otherwise exit the vehicle 102 or stop using the vehicle's service(s). Alternatively, the user can be notified through a display device of the vehicle 102, such as a display device of an infotainment system of the vehicle 102.

Although reference is made to examples where user access of the vehicle 102 is temporary (e.g., taxi or ridesharing, vehicle rental, vehicle sharing, etc.), it is noted that techniques according to some implementations can be applied in a more permanent context where the user is intended to have permanent access of the vehicle 102. For example, the user may be the owner of the vehicle 102, and is granted the service access information to access the service(s) of the vehicle 102. However, the vehicle 102 may be stolen or borrowed by another driver (e.g., a family member, a friend, etc.), in which case the service access information can be revoked while the user is not in possession of the vehicle 102.

Additionally, in further examples, when the vehicle 102 crosses a border between different geographic regions (e.g., different states, provinces, or countries), new service access information can be provided to the user device 104 to access the service(s) of the vehicle 102. The new service access information can be provided by a communications backhaul link to the use device 104 such as cellular or another technology. Different geographic regions may use different service providers or operators in connection with the service (s) of the vehicle 102. If new service access information is created when the vehicle 102 crosses into a given geographic region, the new service access information can be revoked once the vehicle 102 leaves the given geographic region.

Figure 3:
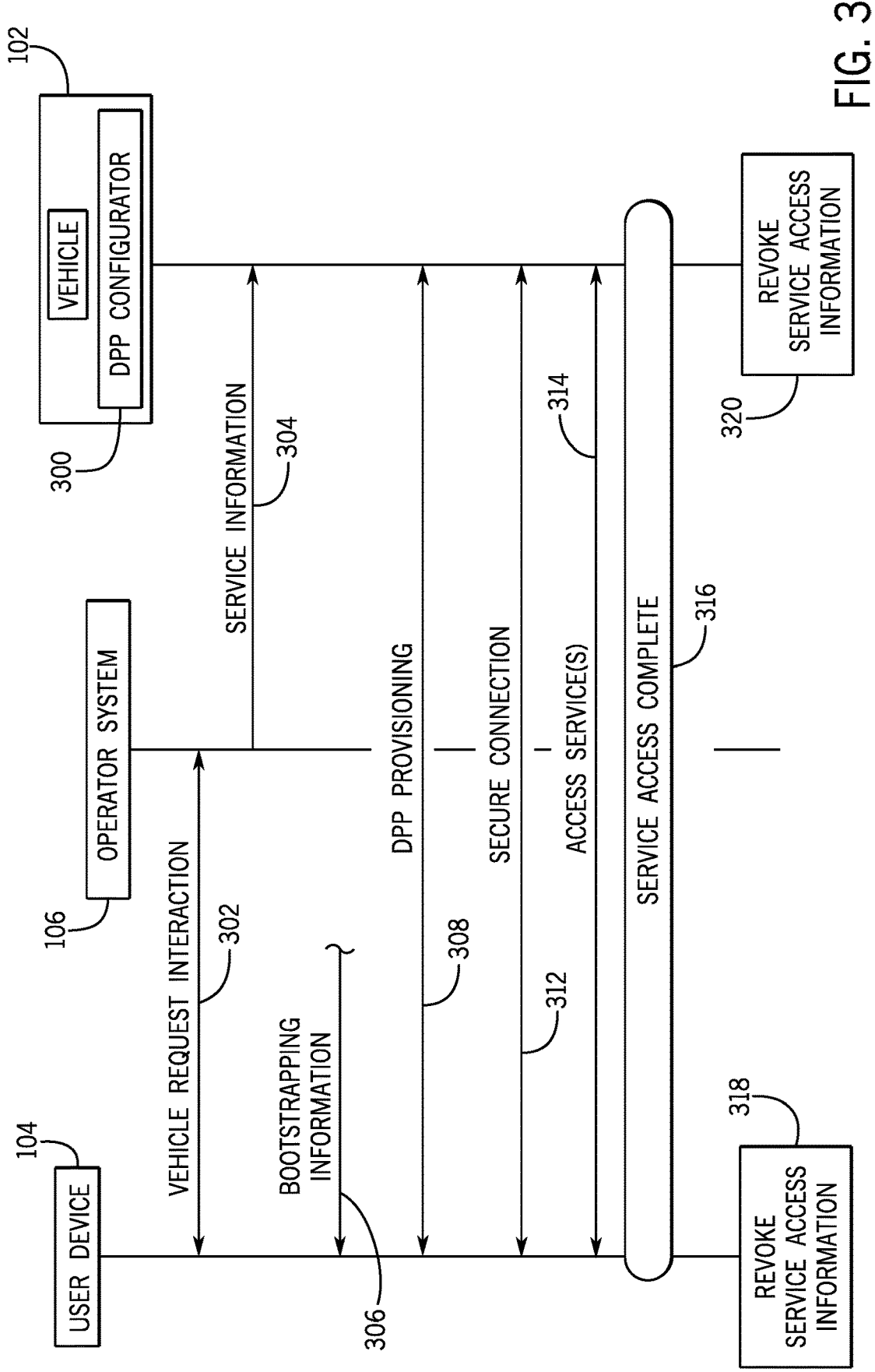

While FIG. 2 depicts indirect provisioning of the user device 104 by the DPP Configurator 200 of the operator system 106, FIG. 3 shows an alternative example in which a DPP Configurator 300 of the vehicle 102 can perform direct provisioning of the user device 104 that is to access a service of the vehicle 102.

In FIG. 3, it is assumed that the vehicle 102 has network connectivity with the operator system 106 used to manage the service, and the operator system 106 has the ability to push provisioning information (such as the bootstrapping information and policy information for the device session to the vehicle).

As shown in FIG. 3, the user device 104 performs a vehicle request interaction (at 302) with the operator system 106 to allow a user of the user device 104 to obtain access of the vehicle 102 (a process similar to the interaction 202 of FIG. 2). Once the user is granted access to the vehicle 102 in response to the interaction (302), the operator system 106 can provide (at 304) service information to the vehicle at 102, where the service information indicates the service(s) that (is) are available to the user device 104.

The user device 104 further receives (at 306) bootstrapping information from one of multiple sources (QR code, email, text message, web link etc.).

Once the user is able to access the vehicle 102 (such as by entering the vehicle 102 or coming within a specified proximity of the vehicle 102), the user device 104 can perform, using the bootstrapping information, DPP provisioning (at 308) with the DPP Configurator 300 of the vehicle 102. The DPP provisioning includes authenticating the user device 104 and providing configuration information to the user device 104.

The remaining tasks 312, 314, 316, 318, and 320 are similar to corresponding tasks 212, 214, 216, 218, and 220 of FIG. 2.

Bootstrapping

Bootstrapping information (received by the user device 104 at 206 in FIG. 2 or 306 in FIG. 3) can be obtained in any of various different ways in the following different contexts. In examples where the vehicle 102 is a taxi or other vehicle that can be requested for transportation of the user, the bootstrapping information is obtained in the following manner.

A specified code, such a QR code or barcode (that includes a unique bootstrapping key) can be provided for each ride. The specified code can be associated with a payment transaction process. A display screen in the vehicle 102 (e.g., a taxi or other vehicle) can display the specified code that can be scanned by a camera of the user device 104. For example, an application on the user device 104 can control the capture of the displayed specified code.

In other examples, obtaining the bootstrapping information can be performed ahead of the ride, such as by accessing a website or other source (e.g., when the user performs the vehicle request interaction 202 or 302 to request access of the vehicle 102).

In other examples, an existing authenticated connection between the user device 104 and the vehicle 102 can be used.

In this example, the service access information can be revoked once the ride is over and payment has been made for the ride.

In examples where the vehicle 102 is a rental vehicle or a shared vehicle that can be rented by a user, the bootstrapping information can be obtained in the following ways. The user can be provided with a specified code (e.g., QR code or barcode) including the bootstrapping information with a time expiry set to the end of rental period at booking time or through the vehicle 102 directly. The specified code can be provided to the user device 104 at the time of making the vehicle reservation, or alternatively, the specified code can be displayed by a display device of the vehicle 102, and can be scanned by a camera of the user device 104.

In some examples, the specified code can include a token that uniquely identifies a rental agreement governing the rental of the vehicle 102.

The specified code can be used to provision multiple user devices, if enabled by the vehicle rental company.

Also, in some examples, at the time of reserving the vehicle 102, the vehicle rental information provided to the user device 104 can include Bluetooth pairing information to allow the user device 104 to establish a Bluetooth connection with the vehicle 104, or alternatively, the vehicle rental information can include Bluetooth bootstrapping information to establish a WI-FI connection with the vehicle 102.

DPP provisioning of the user device 104 can be performed using a vehicle rental application on the user device 104, or based on access of a website by the user device 104.

In this example, the service access information can be revoked at the end of the rental period.

In some examples, bootstrapping involves the user device 104 obtaining a public key of a peer device (e.g., the vehicle 102) that will be used for DPP authentication. Bootstrapping information can be encoded as a uniform resource identifier (URI). Bootstrapping mechanisms utilize any or some combination of the following technologies according to the DPP specification to obtain bootstrapping information: scanning a QR code, static or dynamic NFC communication of the bootstrapping information, BLE communication of the bootstrapping information, exchanging a shared secret, and so forth.

A typical example of the Augmented Backus-Naur Form (ABNF) for the bootstrapping information is as follows:

dpp-qr="DPP:" [channel-list ";"] [mac ";"] [information ";"] public-key ";;"
pkex-bootstrap-info=[information]
channel-list="C:" class-and-channels *("," class-and-channels)
class-and-channels=class "/" channel *("," channel)
class=1*3DIGIT
channel=1*3DIGIT
mac="M:" 6hex-octet; MAC address
hex-octet=2HEXDIG
information="I:" *(%x20-3A/%x3C-7E); semicolon not allowed
public-key="K:" *PKCHAR; DER of ASN.1 SubjectPublicKeyInfo encoded in "base64"
PKCHAR=ALPHA/DIGIT/%x2b/% x2f/%x3d The bootstrapping information can be enforced in either one-way authentication (the user device 104 authenticates the vehicle 102) or mutual authentication (bi-directional authentication between the user device 104 and the vehicle 102). If mutual authentication is used, the user device 104 can exchange bootstrapping keys over the secure connection with the operator system 106.

If the operator system 106 instead of the vehicle 102 includes a DPP Configurator (such as in FIG. 2), the bootstrapping information can contain a domain name or IP address. The following are examples of bootstrapping information that include the domain name carrental.com:

DPP:I:www.carrental.com/config.htm;K:
MDkwEwYHKoZIzj0CAQ
YIKoZIzj0DAQcDIgADM2206avxHJaHXgLMkq/
24e0rsrfMP9K1Tm8gx+ovP0I=;;

Alternatively, the bootstrapping information encoding can be modified to add a domain name:

DPP: D: carrental.com;
K:MDkwEwYHKoZIzj0CAQYIKoZIzj0DAQcDIgAD M2206avxHJaHXgLMk q/24e0rsrfMP9K1Tm8gx+ ovP0I=;;

As a further example, the bootstrapping information can be encoded as a URL:

https://www.carrental.com/ configurator?proto=dpp&key=MDkwEwYHKoZIzj0 CAQYIKoZIzj0DAQcDIgADM2206avxHJaHXgL Mkq/24e0rsrfMP9K1Tm8gx+ovP0I=;;

An example of a bootstrapping URI that provides channel information is as follows:

DPP:C:81/1,115/36;K:
MDkwEwYHKoZIzj0CAQYIKoZIzj0DAQcDIgA DM2206avxHJaHXgLMkq/24e0rsrfMP9K1Tm8gx+ ovP0I=;;

Authentication and Configuration

The following provides further details regarding DPP provisioning (authentication and configuration) according to some examples.

The user device 104 and a DPP Configurator (either in the operator system 106 or the vehicle 102) can perform DPP authentication using bootstrapping information. Once a secure connection is established by the user device 104, the user device 104 sends a DPP Configuration Request frame to the DPP Configurator (200 in FIG. 2 or 300 in FIG. 3). If the user device 104 obtained a token during the vehicle request interaction (202 in FIG. 2 or 302 in FIG. 3), the user device 104 would transmit the token to the DPP Configurator in order to obtain the correct configuration. For Bluetooth pairing, the DPP Configuration Request frame can contain a public key that can be used to perform out-of-band Bluetooth pairing.

In some examples, DPP Configuration Request attributes are encoded using JavaScript Object Notation (JSON) and can have the following form:

```
{
    "name":"My Device",
    "wi-fi_tech":"infra",
    "netRole":"sta",
    "myVehicleReservationToken":"A1B2C3D4E5F6G7H8"
    "myDeviceBTPairingKey:"HDkwEwYHKoZIzj0CXYYIKoZIzj0DA
QcDIgMSN2206avxHJaHXgLMkq/24e0rsrfMP9K1Tm8gx+ovP0I="
}
```

Upon successful reception of the DPP Configuration Request frame, the DPP Configurator can construct a configuration response containing a DPP Configuration Object and a DPP Connector. The DPP Configuration object and DPP Connector are encoded using JSON, for example.

An example DPP Configuration object is set forth below:

```
{
    "wi-fi_tech":"infra",
    "discovery":
    {
        "ssid":"car1138wifi"
    },
    "cred":
    {
        "akm":"dpp",
"signedConnector":
"eyJ0eXAiOiJkcHBDb24iLCJraWQiOiJrTWNlZ0RCUG1OWlZha0FzQlpP
ek9vQ3N2UWprcl9uRUFwOXVGLUVEbVZFIiwiYWxnIjoiRVMyNTYifQ.ey
Jncm91cHMiOlt7Imdyb3VwSWQiOiJob21lIiwibmV0Um9sZSI6InN0YSJ
9LHsiZ3JvdXBJZCI6ImNvdHRhZ2UiLCJuZXRSb2xlIjoic3RhIn1dLCJk
ZXZpY2VzIjpbeyJkZXZpY2VJZCI6IkcxWWFKWU1iQTkwMjlvY1AzQlZDZ
zVrajN5R0hXWWkzTTJoSnF5T21jeFEiLCJuZXRSb2xlIjoic3RhIn0sey
JkZXZpY2VJZCI6IkF6cy1rc2VmaWVuMUNBOEVZSWxpdTZONnZHclRhM3F
vd3FDSEtLOEl1MFkiLCJuZXRSb2xlIjoic3RhIn1dLCJuZXRRY2Nlc3NL
ZXkiOnsia3R5IjoiRUMiLCJjcnYiOiJQLTI1NiIsIngiOiI4QTF0LUVPV
WxMajBZNm5rUU9GMy1tNDgxdm9TM1FaLUlaemlSLUtMTHVJIiwieSI6Im
NnYnEzOUJ5SnpWYkZ0WVdUVEVUcE52QnBBUnVuRXRUMlNzaTg0eEFubDA
iLCJraWQiOiJCUkRNX1JOemlfeGtRcTdGT0RlbXpoc2VXQkUzM21ybTAz
OHdZUjdZOWE4In0sImV4cGlyeSI6IjIwMTktMDEtMzFUMjI6MDA6MDArM
DI6MDAifQ.ED65oTLhYTFAw9E5mgDESELSIS3AyRapVWfHT2y7r19big8
uY8ge0BiXUSQjOew5KUuNR3qb9d8kFuMQr6RTfA",
        "csign":
        {
            "kty":"EC",
            "crv":"P-256",
        "x":"MKBCTNIcKUSDii11ySs3526iDZ8AiTo7Tu6KPAqv7D4",
        "y":"4Etl6SRW2YiLUrN5vfvVHuhp7x8PxltmWWlbbM4IFyM",
        "kid":"kMcegDBPmNZVakAsBZOzOoCsvQjkr_nEAp9uF-EDmVE"
        },
    },
        "bt_pair_key":"ERkeroDFE989FEAk2j0CXYYIKoZIzj0DAQcDI
gMSN2206avxHJaHXgLMkg/24e0rsrfMP9K1Tm8gx+ovP0I=L"
}
```

An example DPP connector object can be as follows:

```
{
  "groups":
  [
    {"groupId":"preferred","netRole":"sta"},
    {"serviceId":"nav"},
    {"serviceId":"spotify"},
    {"serviceId":"VoWiFi"},
    {"serviceId":"netAccess"}
  ],
  "netAccessKey":
  {
    "kty":"EC",
    "crv":"P-256",
    "x":"8A1t-EOUlLj0Y6nkQOF3-m481voS3QZ-IZziR-KLLuI",
    "y":"cgbq39ByJzVbFtYWTTETpNvBpARunEtT2Ssi84xAnl0"
  },
  "expiry":"2019-01-31T22:00:00+02:00"
}
```

In the foregoing, the various ServiceId fields of the DPP Connector identify respective services. The netAccessKey is a credential that can be used to set up a secure connection between the user device 104 and the vehicle 102 to access the service(s) of the vehicle 102.

The user device 104 uses the service information (the ServiceId fields) in the DPP Connector to establish service connectivity to applications running on the vehicle 102. The user device 104 can exchange personal preference information and application configuration information with the vehicle 102.

In further examples, if the service provided by the application of the vehicle 102 uses a credential (such as a credential to access a media content application), then this application credential can be used to proxy connectivity to the vehicle 102 to establish the secure connection between the user device 104 and the vehicle 102.

Service Access Completion

As explained above, upon service access completion, service access information (including the credential and other information with respect to the access of the vehicle's service) is revoked at both the user device 104 and the vehicle 102.

The revocation of the service access information can be triggered in a few ways. For example, the service access information can be revoked in response to expiry of the DPP Connector, based on the expiry time provisioned in the DPP Connector.

As another example, the service access information can be revoked by the operator system 106 in response to the user triggering the end of access of the vehicle 102 (such as the end of the rental of the vehicle 102 based on return of the vehicle 102, end of the ride of the vehicle 102 based on payment for the ride, etc.).

As a further example, the service access information can be revoked by the vehicle 102 in response to the user triggering the end of access of the vehicle 102.

As yet another example, the service access information can be revoked by the vehicle 102 in response to the user moving out of coverage (e.g., WI-FI or Bluetooth coverage) of the vehicle 102 after a trigger that the vehicle access is complete. The trigger condition can be a result of the user interacting with an application running on the user device 104, or interacting with the vehicle's user interface.

As another example, the service access information can be revoked by sending a message or information element (e.g., a de-authentication or disassociation message or information element) with a respective reason code. The value of the reason code may cause the user device 104 or vehicle 102 to delete the service access information from memory and never try connecting again.

The revocation of the service access information can include deleting the service access information or otherwise indicating that the service access information is invalid. Indicating that the service access information is invalid can be accomplished by flagging the service access information stored in memory as inactive (or invalid), such that the service access information cannot be used. This allows the user device 104 or vehicle 102 to respond to failed authentications with different response codes for credentials or other service access information that do not exist yet versus credentials or other service access information that did exist but are now expired or invalid for some other reason.

The following gives details on how DPP may be adapted to perform revocation of service access information.

The following describes revocation of the service access information on the vehicle 102 (or more specifically, on the AP of the vehicle 102 in examples where the vehicle 102 provides a WLAN). In such examples, the operator system 106 establishes a secure connection with the vehicle 102 to delete the DPP Connector, for example. A configuration key allows the DPP Configurator to re-establish a connection to the vehicle 102. The configuration key can be a new key derived as a result of successful DPP authentication, or existing keys such as the netAccessKey from the enrollee device (the vehicle 102) and the configurator signing key from the DPP Configurator. The DPP Configurator in the operator system 106 uses its configuration key to authenticate itself to the vehicle 102. The vehicle uses its configuration key to authenticate itself to the DPP Configurator in the operator system 106 (i.e., the DPP Configurator would have to store vehicle's enrollee netAccessKey). The revocation process can be as follows. The DPP Configurator establishes a secure connection with the vehicle 102. The DPP Configurator securely sends a Configuration Request frame to the vehicle 102 containing revocation information. The revocation information includes information used to revoke the service access information. For example, the revocation information can include: Wi-Fi, Bluetooth, or NFC pairing credentials; application access information including any credential information associated with application access; browser cache or search information; search parameters for navigation or any information associated with navigating a route; and so forth.

The following describes revocation of the service access information on the user device 104. The user device 104 establishes a connection to either the DPP Configurator in the operator system 106 or the DPP Configurator in the vehicle 102 using a configuration key. The revocation process can be as follows. The DPP Configurator establishes a secure connection with the user device 104. The DPP Configurator securely sends a Configuration Request frame to the user device 104 containing revocation information.

Within the user device 104, an application (such as a ridesharing application or vehicle rental application) may interact with a WLAN manager (running on the user device 104) to remove the service access information that the application had previously created. For security and privacy reasons, the operating system (OS) of the user device 104 does not allow the application to change or delete other service access information that was not previously created by the particular application.

The revocation of a service access information may cause the user device 104 (such as an application or an operating system in the vehicle 104) to query the information revoking store 124 in the operator system 106 over another connection (e.g., a cellular connection different from the vehicle's wireless network). In response to this query, the user device 104 can verify if the revocation was due to the normal completion of access of the vehicle 102, or for some other purpose (e.g., the vehicle 102 was reported stolen). This information may be used to determine whether the service access information should be stored and reused later on, or deleted. The information in the query response may also be displayed to the user.

System Architecture

Figure 4:
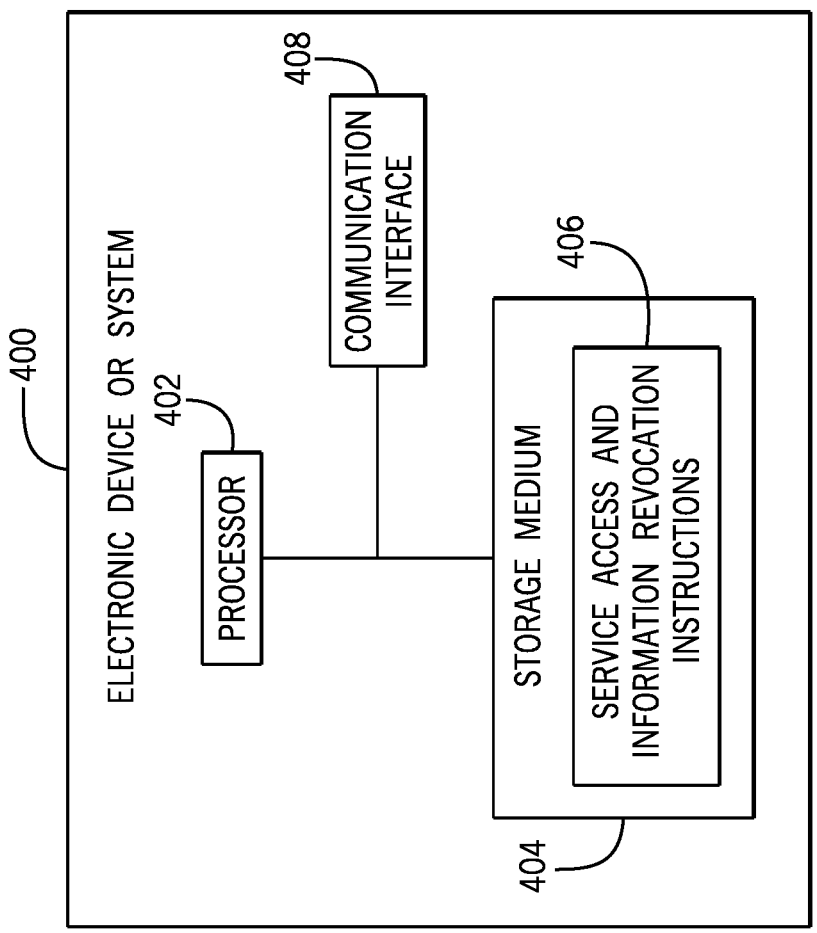
FIG. 4 is a block diagram of an electronic device or system according to further examples.

FIG. 4 is a block diagram of an electronic device or system 400 according to some examples. The electronic device or system 400 can include any of the user device 104, the vehicle 102, or the operator system 106 discussed above.

The electronic device or system 400 includes a processor 402 (or multiple processors). A processor can include a microprocessor, a core of a multi-core microprocessor, a microcontroller, a programmable integrated circuit, a programmable gate array, or another hardware processing circuit.

The electronic device or system 400 further includes a non-transitory machine-readable or computer-readable storage medium 404 that stores machine-readable instructions executable on the processor 402. Machine-readable instructions executable on a processor can refer to the instructions executable on a single processor or the instructions executable on multiple processors. The electronic device or system further includes a communication interface 408 for communication over a communication medium with external entities.

The machine-readable instructions include service access and information revocation instructions 406 that can allow a user device to access a vehicle's service, and to revoke service access information upon completion of the service access.

The storage medium 404 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
scanning, by an electronic device associated with a user renting a vehicle, a specified code displayed by a display device of the vehicle, wherein the specified code includes bootstrapping information with a time expiry set to an end of a rental period for the vehicle;
using, by the electronic device, the bootstrapping information to establish a connection with a configurator device;
receiving, by the electronic device from the configurator device, configuration information relating to network connectivity with a network of the vehicle, the configuration information including a credential;
establishing, by the electronic device using the configuration information, a connection with the network of the vehicle to access a service; and
revoking the credential in response to a termination of the access of the service, wherein the revoking of the credential comprises:
receiving, by the electronic device, revocation information from the configurator device, the revocation information for revoking the credential, and
in response to the revocation information, deleting the credential or marking the credential as invalid.

2. The method of claim 1, wherein the configuration information comprises Device Provisioning Protocol (DPP) information.

3. The method of claim 2, wherein the configuration information is included in a DPP Connector.

4. The method of claim 1, wherein the connection established by the electronic device with the configurator device is a secure connection, and wherein the configuration information relating to network connectivity is received over the secure connection with the configurator device.

5. The method of claim 4, wherein the configurator device comprises a Device Provisioning Protocol (DPP) Configurator.

6. The method of claim 4, wherein the configurator device is part of the vehicle.

7. The method of claim 1, wherein the revocation information is received from the configurator device in the vehicle.

8. The method of claim 1, wherein the configuration information comprises service information relating to the service accessible by the electronic device.

9. The method of claim 8, further comprising:
using, by the electronic device, the service information to access an application of the vehicle, the application providing the service.

10. The method of claim 8, further comprising revoking the service information in response to the termination of the access of the service.

11. The method of claim 1, further comprising:
in response to the revoking of the credential:
querying, by the electronic device, a server system to determine a cause of the revoking of the credential, and
determining, by the electronic device based on a response to the querying, whether the revoking of the credential is in response to the vehicle being stolen.

12. The method of claim 1, wherein the specified code further includes a token that uniquely identifies a rental agreement governing the renting of the vehicle.

13. An electronic device associated with a user renting a vehicle, the electronic device comprising:
a communication interface;
a camera; and
at least one processor coupled to the communication interface and the camera, the at least one processor being configured to:
receive, from the camera, a specified code displayed by a display device of the vehicle and scanned by the camera, wherein the specified code includes bootstrapping information with a time expiry set to an end of a rental period for the vehicle;
use the bootstrapping information to establish a connection with a configurator device;
receive configuration information relating to network connectivity with a network of the vehicle, the configuration information including a credential;
establish, using the configuration information, a connection with the network of the vehicle to access a service; and
revoke the credential in response to a termination of the access of the service, based on user activation of a control item in a user interface indicating the termination of the access of the service, wherein the at least one processor is configured to revoke the credential by:
receiving revocation information from the configurator device, the revocation information for revoking the credential, and
in response to the revocation information, deleting the credential or marking the credential as invalid.

14. The electronic device of claim 13, wherein the at least one processor is configured to:
obtain a new credential in response to the vehicle crossing a border between different geographic regions.

15. The electronic device of claim 13, wherein the configuration information comprises service information relating to the service accessible by the electronic device, and the at least one processor is configured to:
use the service information to access an application of the vehicle, the application providing the service.

16. The electronic device of claim 13, wherein the at least one processor is configured to:
in response to the revoking of the credential:
query a server system to determine a cause of the revoking of the credential, and
determine, based on a response to the querying, whether the revoking of the credential is in response to the vehicle being stolen.

17. The electronic device of claim 13, wherein the specified code further includes a token that uniquely identifies a rental agreement governing the renting of the vehicle.

18. A non-transitory machine-readable storage medium comprising instructions that upon execution cause an electronic device associated with a user renting a vehicle to:
receive a specified code displayed by a display device of the vehicle and scanned by a camera of the electronic device, wherein the specified code includes bootstrapping information with a time expiry set to an end of a rental period for the vehicle;
use the bootstrapping information to establish a connection with a configurator device;
receive, from the configurator device, configuration information relating to network connectivity with a network of the vehicle, the configuration information including a credential;
establish, using the configuration information, a connection with the network of the vehicle to access a service; and
revoke the credential in response to a termination of the access of the service, wherein the revoking of the credential comprises:
receiving revocation information from the configurator device, the revocation information for revoking the credential, and
in response to the revocation information, deleting the credential or marking the credential as invalid.

19. The non-transitory machine-readable storage medium of claim 18, wherein the configuration information comprises Device Provisioning Protocol (DPP) information.

20. The non-transitory machine-readable storage medium of claim 19, wherein the configuration information is included in a DPP Connector.

21. The non-transitory machine-readable storage medium of claim 18, wherein the configurator device comprises a Device Provisioning Protocol (DPP) Configurator.

22. The non-transitory machine-readable storage medium of claim 18, wherein the configurator device is part of the vehicle.

23. The non-transitory machine-readable storage medium of claim 18, wherein the specified code further includes a token that uniquely identifies a renting agreement governing the rental of the vehicle.

* * * * *